Jan. 2, 1962 C. W. CLARAS ETAL 3,015,695
AMPLIFIER SYSTEM FOR MAGNETIC RECORDER-REPRODUCER
Filed Jan. 31, 1958
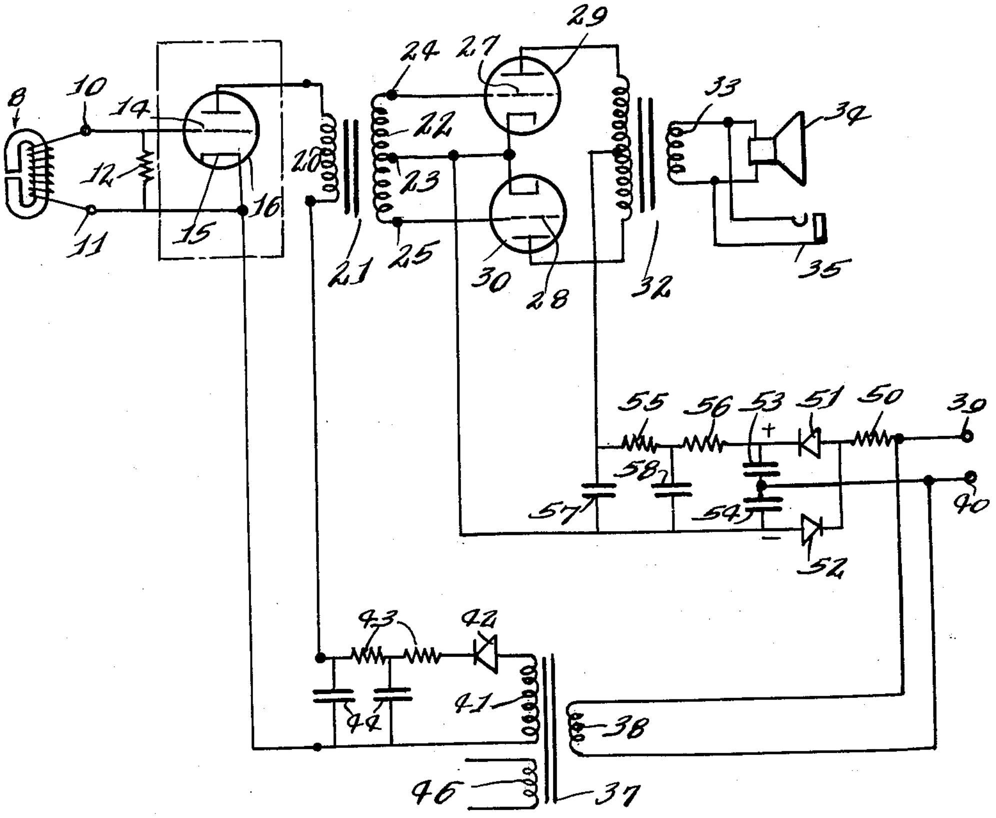
Inventors:
Carl W. Claras,
Theodore Wickstrom
By Zabel, Baker, York, Jones & Dithmar
Attorneys.

3,015,695
Patented Jan. 2, 1962

3,015,695

AMPLIFIER SYSTEM FOR MAGNETIC RECORDER-REPRODUCER

Carl W. Claras, Western Springs, and Theodore Wickstrom, Skokie, Ill., assignors, by mesne assignments, to Revere Camera Company (formerly Samica Corporation), a corporation of Delaware

Filed Jan. 31, 1958, Ser. No. 712,560
2 Claims. (Cl. 179—1)

This invention relates to amplifier systems for magnetic recorder-reproducers and, in general, provides an amplifier system which is particularly adapted for small portable magnetic recorder-reproducers.

Magnetic recorder-reproducers for magnetic tape or wire are in wide use. Such systems include amplifiers for recording on or reproducing from tape or wire and suitable switching means for operating on the circuits to condition them for a desired function. As a rule, the amount of amplification necessary for recording purposes is substantially less than for reproducing. This is particular true if the magnetic recorder-reproducer is provided with connections and switching means to permit the amplifier to be used, for example, in public address systems. In addition, many magnetic recorder-reproducer systems provide substantial audio power output during reproduction in the order of from 5 to 15 or more watts. When apparatus embodying such a system is to be portable, it is essential that weight be reduced to a minimum.

It is clear that certain components, such as one or more electric motors, and resistors and condensers cannot be eliminated. In general, such components are available in such highly refined forms as to be at minimum in size and weight. The major items of weight in a magnetic recorder-reproducer generally are the iron core transformers.

For high quality work, the output audio frequency transformer must contain substantial iron and copper. While careful design may reduce the weight of such a transformer, it is, as a rule, not possible to cut down the weight from that required for a desired power rating. Another transformer where substantial weight may be involved is the power transformer.

In some electronic apparatus it is possible to eliminate power transformers and employ an A.C.-D.C. amplifier which is connected directly to the power line. However, such amplifiers generally are unsuitable for magnetic recording apparatus due to the difficulty of hum isolation with the high amplification requirements of magnetic recorder-reproducers.

Also, portable tape recorders must be capable of connecting directly to other equipment such as radio, phonograph, television, etc. In this respect a power line connected amplifier is objectionable for the reason that line voltage is impressed on the chassis of such other equipment. Severe shock hazard sometimes can be minimized by placing an impedance in series with the B— of the amplifier, but such series impedance induces a severe hum voltage on the amplifier input.

As previously mentioned, the maximum number of stages of amplification are required during reproduction, assuming that a high audio output power level is desired. In such a case, the final or output stage will generally consist of two tubes in push-pull. Such tubes may be triodes, although they are usually beam power tubes or pentodes.

A push-pull stage which can deliver, for example, between 10 and 15 watts of audio output will generally have space current requirements of the order of from 75 mils and up. By comparison with the push-pull stage, all of the preceding stages, hereinafter referred to as pre-amplifier or voltage amplifier stages, including the driver stage, just ahead of the push-pull stage, will generally have a combined space current requirement of less than 20% of the push-pull stage. A substantial portion of such required current may be dissipated in resistors for isolating the push-pull stage from the other stages.

In accordance with the present invention, it is proposed to decrease substantially the weight of a portable magnetic recorder-reproducer combination by separating, insofar as power supply is concerned, the power output stage of the audio frequency amplifier from all of the preceding stages. Accordingly, it is found possible to eliminate the power transformer in the power supply for the power stage while maintaining a conventional power transformer and power supply for the preamplifier stages ahead of the power output stage. In the practical application of this invention it will be understood that the power stage may either be one tube or a pair of tubes in push-pull, the latter being preferred.

By virtue of the present invention, it is possible to effect substantial economies in the manufacture of a magnetic recorder-reproducer while, at the same time, to provide a system which is substantially less bulky, lighter in weight and can, during reproduction, provide excellent quality.

In order that the invention may be fully understood a diagrammatic and simplified showing thereof is given in the accompanying drawing with the understanding that variations may be made in the application of the invention to practical devices without departing from the scope of the invention.

The single figure in the drawing shows, in simplified form, the amplifier portion of a portable magnetic recorder-reproducer of the type operating on tape. The entire system includes the usual tape reels, tape driving mechanism, interlocking switches for control purposes, recording-reproducing and erase heads and a complete amplifier system with speaker. A circuit diagram of the amplifier system during reproduction is shown. Switching circuits and recording equipment and circuits are not shown in order to simplify the drawing. Inasmuch as magnetic recorder-reproducers having push-pull output stages and having suitable switching means for going from play to record and back again are well known, it is believed unnecessary to show the complete magnetic recorder-reproducer system.

Referring now to the drawing, a reproducer head 8 is connected to input terminals 10 and 11. A resistor 12 is connected across terminals 10 and 11, said terminals being connected respectively to control grid 14 and cathode 15 of vacuum tube amplifier 16. Tube 16 is the first stage of a number of additional stages of voltage amplification all of which may be designated as a pre-amplifier, and the pre-amplified output will appear at primary 20 of driver transformer 21.

Referring to transformer 21, this transformer is provided with a secondary 22 having center tap 23 and end terminals 24 and 25. Terminals 24 and 25 are connected respectively to grids 27 and 28 of a pair of vacuum tubes 29 and 30 in push-pull relation. For simplicity these tubes are shown as triodes. In practice beam or pentode tubes are used.

It is understood that instead of having transformer secondaries to drive the push-pull tubes, it is possible to have a pair of driver tubes in push-pull or to have one tube driving tube 29 and another tube with phase inversion driving tube 30. Inasmuch as there are various circuits for going from a single tube type amplifier to push-pull, it will be understood that the transformer illustrated here is exemplary.

Push-pull tubes 29 and 30 are connected to feed output transformer 32, secondary 33 of which may supply speaker 34 or an output jack 35 for external use.

So far the above described amplifier system is conventional. Referring back to the pre-amplifier or voltage stages ahead of the aforesaid power stage of tubes 29 and 30, the space current for the voltage amplifiers is provided by conventional power supply means including power transformer 37. Power transformer 37 has primary 38 connected directly to power line terminals 39 and 40. Power transformer 37 has high potential step-up winding 41 connected to one or more rectifiers 42 and suitable filter means, such as resistors 43 and condensers 44.

The illustrated power supply is of the half wave type but it is clear that a full wave rectifier system may be used. Because of the low current drain on the power supply it is also possible to use chokes instead of resistors. However, the low current permits the use of resistors for efficient filtering.

Power transformer 37 may also be provided with winding 46 for energizing the heater filaments of the tubes in the pre-amplifier stages or the power stages or both. It also is possible to connect the heaters in series and supply them directly from the power line. In the practical application of the invention, the power supply for the pre-amplifier space current may have a current carrying capacity of about 7 to 10 mils.

In accordance with the present invention, the space current requirements of power stage 29 and 30 are provided by electrical connection direct to the power line, thus eliminating a heavy and bulky transformer. Referring to power terminals 39 and 40, isolating resistor 50 is provided in one line, this circuit continuing through rectifiers 51 and 52. Rectifiers 51 and 52 together with condensers 53 and 54 are connected to provide a voltage doubling circuit. The output of this rectifier system is fed through a filter network consisting of resistors 55 and 56 and condensers 57 and 58. The output of this power supply, including the filter network, is connected in conventional fashion to the center of the primary of the output transformer 32 and the cathodes of the power stage.

By virtue of the above arrangement, complete isolation between the power supplies for the power stage and the pre-amplifier stages is obtained. In addition, the push-pull arrangement of the power stage insures substantially complete suppression of hum. The arrangement, as disclosed above, substantially isolates the power line from any metallic connection with parts of the apparatus, it being understood that the system will not be grounded at points other than the B— of the pre-amplifier. With the power supply of the pre-amplifier isolated from the power line by means of its power transformer and the audio power stages isolated by means of their driver and output transformers, the entire amplifier has all the advantages of a unit that has a large power transformer supplying the entire amplifier.

It is clear that substantial power handling capacity can be incorporated in the output stage without adding to the weight except for minor added weight in the output transformer made necessary by the higher power output. Thus in a typical magnetic recorder-reproducer, a power transformer for the complete system under conventional procedure would have weighed at least three pounds and cost at least $3.00. By utilizing the invention, the same audio power output of between 10 and 15 watts is obtained with a power transformer weighing eight ounces and costing a little over $1.00. In this typical arrangement, winding 46 energizes all tube heaters. In addition, the amount of power transformer space is reduced from about 30 cubic inches to about 5½ cubic inches, thus making it possible to materially reduce the overall dimensions of the complete apparatus.

In the practical application of the invention during recording it is possible to use one of the push-pull tubes as an oscillator for erasing. It is understood, of course, that suitable switching means will be provided for changing the amplifier set-up from reproduction, as illustrated here, to recording. It is also understood that the source of the power will be an alternating current line, usually 117 volts at 60 cycles. By virtue of the voltage doubling circuit, the full power capacity of conventional tubes may be used.

From the above description it is thought that the construction and advantages of our invention will be readily apparent to those skilled in the art. Various changes in detail may be made without departing from the spirit or losing the advantages of the invention.

Having thus described our invention, what we claim as new and desire to secure by Letters Patent is:

1. In a magnetic recorder-reproducer having a reproducing head in which low-level potential is generated, an amplifying system for amplifying said potential and delivering output power, said amplifying system energized from an alternating current power line and comprising:

a pre-amplifier stage connected to said reproducing head;

a power output stage including an input transformer connected to said pre-amplifier stage and an output transformer connected to a speaker and adapted to be connected to auxiliary output equipment, said power output stage having space current requirements of at least five times the space current requirements of said pre-amplifier stage;

a power supply for said pre-amplifier stage inductively connected to the alternating current power line and including a step-up power transformer connected to said power line and rectifier and filter means connected between said step-up power transformer and said pre-amplifier stage;

and a separate power supply for said power output stage conductively connected to the alternating current power line and including resistance, capacitance and rectifier means connected between said power line and the secondary of said input transformer and the primary of said output transformer;

whereby said pre-amplifier stage is isolated from conductive connection with the power line so that hum conditions are minimized and auxiliary input equipment safely may be connected to said pre-amplifier stage, and whereby said power output stage which is conductively connected to the power line is isolated from said pre-amplifier stage and from the speaker and auxiliary output equipment by said input and output transformers respectively.

2. The combination of claim 1 wherein said separate power supply for said power output stage includes a plurality of rectifiers and capacitances connected for doubling the voltage.

References Cited in the file of this patent

UNITED STATES PATENTS

| | | |
|---|---|---|
| 2,004,368 | Crossley | June 11, 1935 |
| 2,068,752 | Loewe | Jan. 26, 1937 |
| 2,123,241 | Harley | July 12, 1938 |
| 2,170,873 | Price | Aug. 29, 1939 |
| 2,228,112 | Hansell | Jan. 7, 1941 |
| 2,473,265 | Watkinson | June 14, 1949 |